United States Patent Office 3,405,759
Patented Oct. 15, 1968

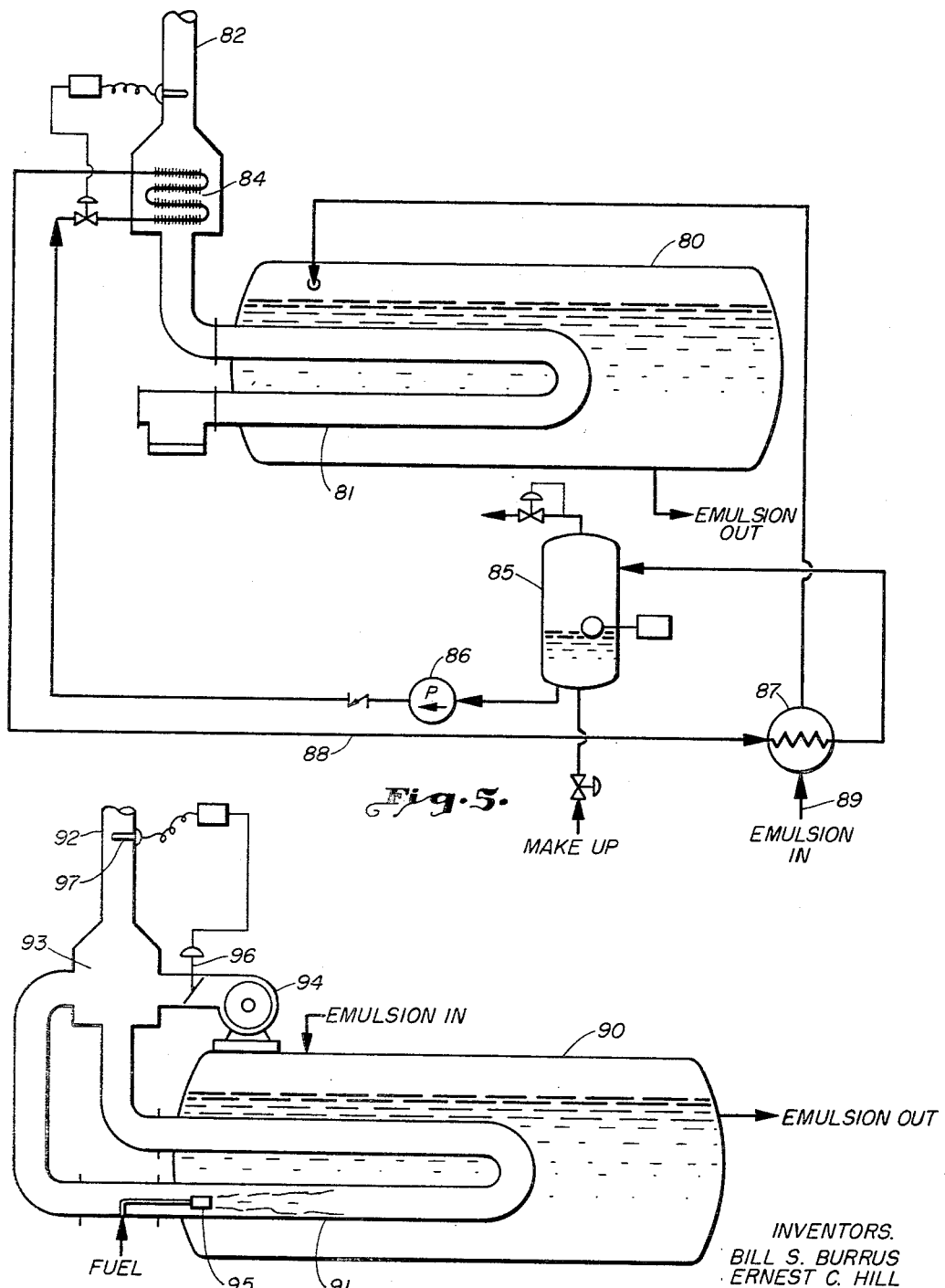

3,405,759
METHOD OF AND MEANS FOR CONTROLLING THE EXTERNAL TEMPERATURES OF FIRED PROCESSING EQUIPMENT
Bill S. Burrus, Ernest C. Hill and Robert W. Coggins, Tulsa, Okla., and Don R. Boling, New Orleans, La., assignors to Combustion Engineering, Inc., New York, N.Y., a corporation of Delaware
Filed Nov. 8, 1966, Ser. No. 592,919
3 Claims. (Cl. 165—39)

ABSTRACT OF THE DISCLOSURE

A heat exchanger is mounted in the exhaust stack of fired oil field equipment with a temperature element placed in the stack and connected to control a flow of fluids through the exchanger to regulate the temperature of the fluids exhausted from the stack to below the ignition temperature of hazardous fluids external the equipment.

Our invention relates to control of external temperatures of fluid processing equipment to below the ignition temperautre of hazardous fluids that collect outside of the equipment.

Oil well production equipment is representative of all processing equipment which is inherently in a dangerous environment. Oil and gas are readily combustible. Uncontrolled and undetected collections of this material can develop without warning around the fired equipment used to provide the initial field-processing of oil and gas.

Off-shore installations have emphasized the hazards of operating field-processing units requiring the heat of combustion process. The platforms are small, the equipment units close together, the combustion poses an ever present threat. There is a need to insure that the products of combustion are not discharged at the ignition temperature of prospective collections of any hazardous fluids around the equipment.

An object of the invention is to heat exchange a fluid with products of combustion from field processing equipment so as to maintain the temperature of the products of combustion at, or below, a predetermined value.

Another object is to utilize the heat absorbed from the products of combustion in the process to reduce the heat load on the combustion process.

The present invention contemplates a vessel in which a process is accomplished by the use of heat from combustion apparatus mounted in association with the vessel. The products of combustion give up heat to the process and are then exhausted, or discharged, to the atmosphere. A heat exchange structure is mounted in association with the exhaust stack so as to absorb heat from the products of combustion prior to discharge and transmit the heat to a fluid within the heat exchanger. It is contemplated that the fluid within the exchanger be controlled to maintain the temperature of the products of combustion low enough to prevent ignition of hazardous fluids external the heated vessel. Further, it is contemplated the heat absorbed by the fluid be returned to the process in the vessel.

Other objects, advantages and features of the present invention will become readily apparent from the following detailed description of the invention with a specific reference of the accompanying drawings in which:

FIG. 5 is similar to FIG. 3 but illustrates the use of liquid to control heat exchange with an incoming processed fluid; and FIG. 6 illustrates the use of combustion air as a controlling medium for temperature.

GENERAL DISCUSSION OF THE DRAWING DISCLOSURE

Figure 1:
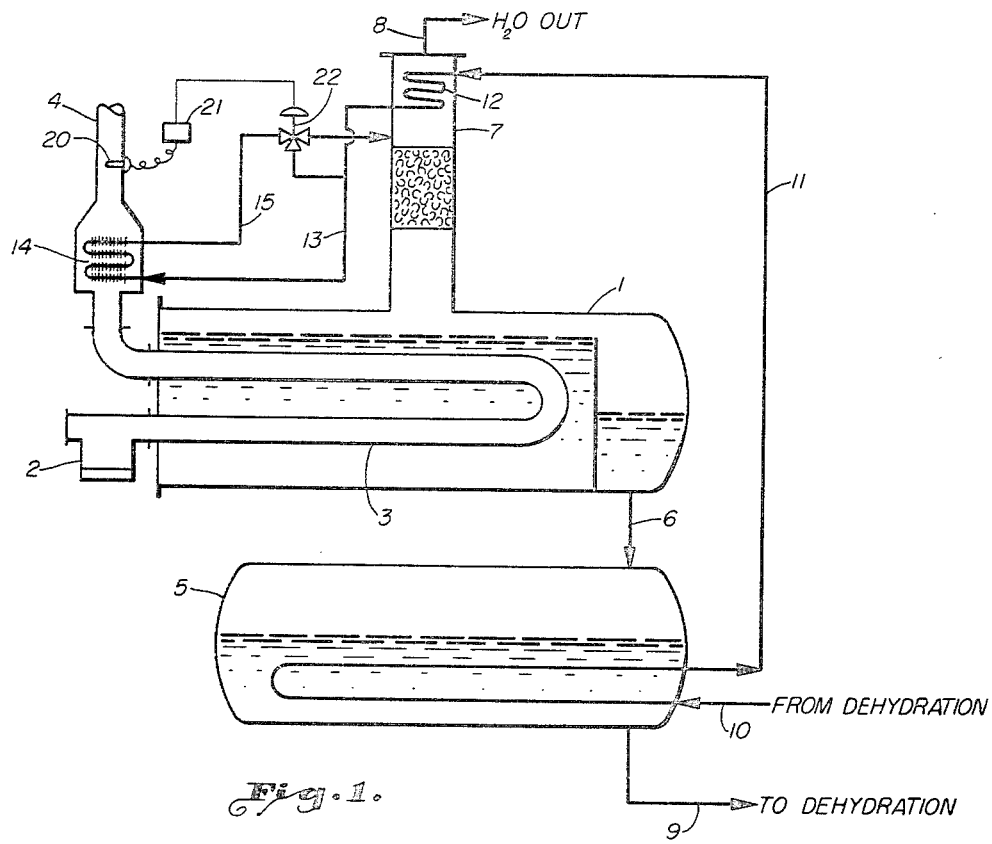
FIG. 1 is schematic illustratioin of a process system in which liquid desiccant is reconcentrated in accordance with the present invention.

Throughout all the drawings the concept is advanced under which the temperature of the products exhausted from the thermal generator of process vessels is controlled to prevent external fire and explosion hazard. First, the most common products exhausted are the gases resulting from the combustion of oil and/or gas in the fire tubes of process equipment. Second, the process vessel is specifically indicated in the drawings as a vessel in which oil well products, or a fluid utilized by such production, is heated for some purpose.

It is to be understood that the present invention is not limited to association with firetubes; any generator of heat, which produces a product normally exhausted to atmosphere, may be controlled by the invention to insure that the temperature of the exhaust does not rise to the ignition temperaure of hazardous fluids external the heated processing equipment. Further, it is to be understood that the type of process carried out has no limitation on the invention; the choice of processes linked with oil well production is simply arbitrary.

Basically, the exhaust temperature of thermal generators, as illustrated, is controlled by heat exchange with a suitable fluid. The heat exchange fluid can then be used to cycle the heat back into the process for salvage. However, the concept here is that of control of the exhaust temperature to prevent hazardous material external the process vessel from being set on fire or exploding.

Figure 2:
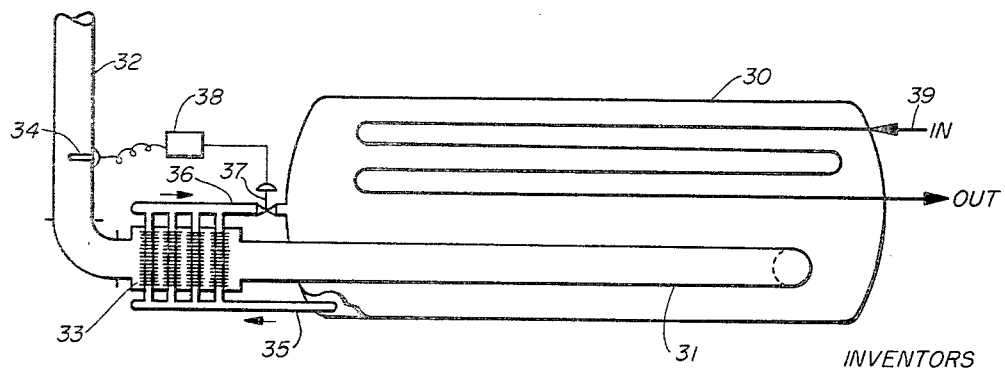
FIG. 2 illustrates an embodiment of the invention wherein the exhaust temperature of an indirect heater is controlled.
Figure 3:
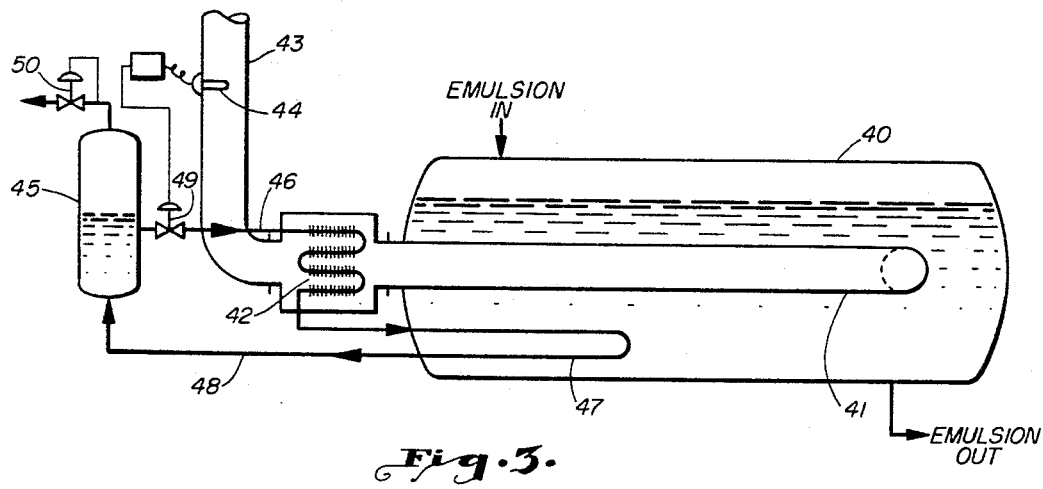
FIG. 3 illustrates the invention in a heating system employing a separate source of liquid in a temperature control circuit.
Figure 4:
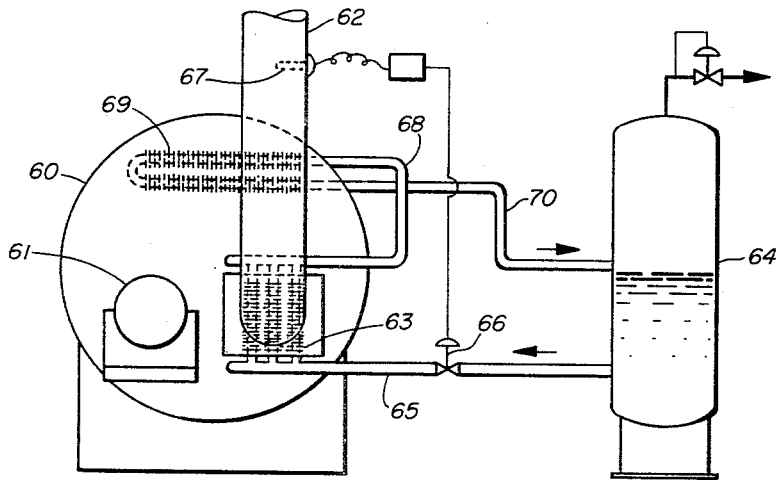
FIG. 4 shows a system similar to that of FIG. 3 wherein heat is cycled back to the processed liquids while controlling temperature.

FIGS. 1 and 2 describe a fluid of the process flowed in controlled heat exchange with the material exhausted from the stack. FIGS. 3–5 disclose a fluid flowed in a separate, captive or re-cycle circuit to provide the controlled heat exchange.

FIG. 6 illustrates the combustion air for the thermal generator preheated by exchange with exhaust to provide the temperature control.

FIG. 1

FIG. 1 illustrates, somewhat schematically, the essential structure required to reconcentrate liquid desiccant for drying fluids such as natural gas. Essentially, the desiccant is heated in vessel 1 by a burner at 2 which is mounted to direct products of combustion down a firetube 3, eventually to be exhausted from the stack 4. The thermally reconcentrated glycol is usually conducted to a reservoir tank 5 through a conduit 6. The water boiled from the desiccant is discharged from the top of still column 7 through conduit 8. The reconcentrated and cooled desiccant is normally conducted from the reservoir 5 through conduit 9.

The reconcentrated desiccant is utilized to contact gas in a structure not shown here. Once this desiccant has absorbed water from the gas it is returned to the system of FIG. 1 for reconcentration. Conduit 10 is the conduit for returning the water-rich desiccant to the system, in FIG. 1, conduit 10 passes this desiccant through a heat exchange coil mounted within reservoir 5 to cool the thermally reconcentrated desiccant and absorb its heat in preparation for its own reconcentration.

The rich desiccant is then conducted from the heat exchange at reservoir 5, by means of conduit 11, to still column 7, where it is again heated in a reflux 12. After the second heating of the desiccant, it is conducted by way of conduit 13 to heat exchange structure 14 mounted in stack 4. The third stage of heating by means of exchange with exhausted products of combustion takes place with exchanger 14. The thrice-heated desiccant is then returned for injection into column 7 from conduit 15 and passage to vessel 1 where the thermal reconcentration is completed.

Obviously a hazardous condition could develop if combustion or inflammable mixture of gasses were to collect externally near this apparatus and come into contact with the products of combustion exhausted from stack 4. The ignition temperatures of these hazardous mixtures might be reached, resulting in serious damage to personnel and/or equipment. Therefore, the present invention provides for reducing the temperature of the products of combustion from firetube 3 so any external hazardous mixture coming into contact with this material will not ignite.

The specific structure for accomplishing this temperature reduction is disclosed as exchanger 14. Obviously, the temperature of the products of the combustion downstream of exchanger 14 should be sensed and controlled. Temperature element 20 is designated as mounted in stack 4 and indicated as establishing a control signal through station 21. This control signal is applied to valve 22 which regulates the amount of rich desiccant passed through exchanger 14.

With temperature element 20 guarding the level of temperatures which external, hazardous fluids may contact, danger from this source is obviated. At the same time, elimination of this hazard may be combined with the conservation of heat from the products of combustion which would otherwise be lost to atmosphere. This salvage of the heat from the products of combustion results in a reduced load upon the burner at 2 which is normally controlled from the temperature level of the thermally reconcentrated desiccant in 1.

FIG. 2

Despite many differences in structure, the heater of FIG. 2 illustrates the same inventive concepts of FIG. 1. A vessel 30 is disclosed as requiring heat supplied by a firetube 31, which has a burner mounted to deliver its products of combustion down firetube 31 for exhaust through stack 32. A heat exchanger 33 is mounted in the products of combustion exhausted from firetube 31, and temperature element 34 is mounted to sense the exhaust temperature thus controlled.

In FIG. 2, the liquid in vessel 30 is circulated through exchanger 33 in a thermosiphonically driven circuit. Specifically, the cooled liquids within vessel 30 are withdrawn from the bottom of vessel 30 through the conduit 35. The liquids are then elevated in temperatures within exchanger 33 and returned to vessel 30 through conduit 36. Fluid in conduit 36 is regulated by valve 37 which is positioned by a control signal generated at station 38 from temperature element 34. Thus, invention is carried out by controlling the exhaust temperature from firetube 31 which exchanger 33 and utilizing the heat exchange maintained in exchanger 33 to return the heat thereby salvaged to vessel 30. The liquids of vessel 30, heated by this arrangement, in turn elevated the temperature of processed liquids passed through heat exchange coil 39 which is mounted in vessel 30

FIG. 3

FIG. 3 differs from the first two figures in utilizing heat exchange liquid in the safety-salvage exchanger which is maintained in isolation from the fluids heated by the firetube. Specifically, vessel 40 is similar to vessel 30 in that liquids requiring heat are directly heated by exchange with firetube 41. Exhaust of firetube 41 is passed over exchanger 42 prior to exhaust from stack 43. Temperature element 44 guards the downstream temperature as in the preceding figures.

In FIG. 3, a separate source of heat exchange fluid is represented as within vessel 45. This fluid is assumed here to be water which is drawn from the lower portion of vessel 45 through conduit 46, passed through exchanger 42 and into heat exchange coil 47 from whence it returns by way of conduit 48 to vessel 45. Valve 49 is mounted in conduit 46 and regulated in position from temperature element 44. Excess heating of the water elevates the temperature enough to develop steam; a controlled venting of this excessive vapor pressure takes place through valve 50.

Here again, the temperature of the stack exhaust is guarded by regulation of a heat exchange fluid through exchange structure mounted in the exhause of a thermal generator. Additionally, the heat extracted from the exhaust is salvaged for use in the process.

FIG. 4

FIG. 4 is similar to FIG. 3 in illustrating a closed circuit for a heat exchange fluid maintained in isolation from fluid normally heated by contact with a firetube. However, the temperature to which water, as the heat exchange fluid, is raised may result in producing substantial amounts of steam. In such case, it is desirable to control the circulation of the water by a valve on the liquid side of the reservoir of water.

Vessel 60 is illustrated as heated by firetube 61, the firetube having an exhaust stack 62. Heater exchanger 63 is mounted in the stack 62 and is connected to water in reservoir 64. The water is as passed through conduit 65 and heat exchanger 63, regulated by valve 66. Valve 66, of course, is positioned by temperature element 67.

The assumption is that enough heat is absorbed by the water in exchanger 63 to vaporize the water into steam. Steam in conduit 68 is passed into exchange coil 69 for delivering the heat of steam to liquids within vessel 60. Whatever water is condensed, and whatever steam remains, is passed through conduit 70 back into vessel 64. The concepts of the invention are embodied in this disclosed structure.

FIG. 5

FIG. 5 is quite similar to FIGS. 3 and 4 provides a heat exchange fluid in a closed circuit for the safety-salvage exchanger. However, whatever pumping is required for the liquid is disclosed, along with the exchange of the heat with the fluids on their way to the main heating vessel. In FIG. 5 the vessel 80 is heated by firetube 81, exhausting through stack 82. Exchanger 84 is mounted in stack 82 and receives liquid pumped by pump 86 from reservoir tank 85. From exchanger 84 the heated fluid is delivered to exchanger 87 by conduit 88 and then returned to vessel 85. In exchanger 84 the heat absorbed from the exhaust of firetube 81 is returned to vessel 80 by way of a process fluid conducted to vessel 80 through conduit 89. Otherwise, the concepts of the invention heretofore illustrated are embodied in FIG. 5.

FIG. 6

The structure of FIG. 6 is distinguished from the foregoing systems. A vessel 90 illustrates a process heater which is supplied heat by firetube 91. The exhaust from this firetube 91 is delivered to stack 92. Heat exchanger 93 is mounted in such stack. However, rather than pass a fluid in a separate circuit through exchanger 93 and then pass this fluid into the material heated in vessel 90, air for combustion at the burner in firetube 91 is preheated.

Blower 94 is illustrated as passing combustion air through exchanger 93 and to burner 95. Preheating is accomplished by exchange with the exhaust of stack 92 and the heat thereby salvaged ends up in the vessel 90. The air through exchanger 93 and controlled by valve 96 is powered by the blower 94 and passed through exchanger 93, regulated from temperature element 97. However, it is noted that the concept of safety from a thermal standpoint is compatible with the preceding structure of the disclosure together with the salvage of the heat while attaining this safety.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for regulating the temperature of heated working fluids discharged from oil field equipment, including,
    a means for elevating the temperature of working fluids which are utilized to elevate the temperature of processed production,
    a stack through which the working fluids are discharged after having processed the production,
    a heat exchange structure mounted in the stack to bring the discharge working fluids into heat exchange relation with fluid within the heat exchange structure,
    a source of fluid connected to the heat exchange structure, the fluid in the heat exchanger controlling the temperature of the working fluids discharged from the stack,
    and a temperature responsive element mounted in the stack downstream of the heat exchanger and connected to regulate the flow of fluid from the source through the heat exchanger to maintain the temperature of the working fluids within a predetermined range.

2. A system for regulating the temperature of products of combustion discharged from fired oil field equipment, including,
    a firetube having a burner mounted in one end of the tube and a stack at the other end through which products of combustion are discharged,
    a process vessel arranged to flow fluids to be processed in a heat exchange relation with an intermediate portion of the firetube,
    a heat exchange structure mounted in the stack of the fire tube to bring the products of combustion into heat exchange relation with fluid within the heat exchange structure, a source of fluid connected to the heat exchange structure, the fluid in the heat exchanger controlling the temperature of the products of combustion discharged from the stack,
    and a temperature responsive element mounted in the stack downstream of the heat exchanger and connected to regulate the flow of fluid from the source through the heat exchanger to maintain the temperature of the products of combustion within a predetermined range.

3. The system of claim 2 including,
    a connection between the output of the heat exchange structure and the fluids of the process vessel, which connection is arranged to flow the heat absorbed in the exchanger into the process fluids.

References Cited
UNITED STATES PATENTS

| | | | |
|---|---|---|---|
| 2,445,102 | 7/1948 | Benn | 165—39 |
| 3,119,674 | 1/1964 | Glasgow et al. | 55—32 |
| 3,260,512 | 7/1966 | Claessens | 165—66 |

ROBERT A. O'LEARY, *Primary Examiner.*

CHARLES SUKALO, *Assistant Examiner.*